Nov. 28, 1933.         A. MOORHOUSE         1,936,685
                          CLUTCH
               Filed Dec. 29, 1928          2 Sheets-Sheet 2
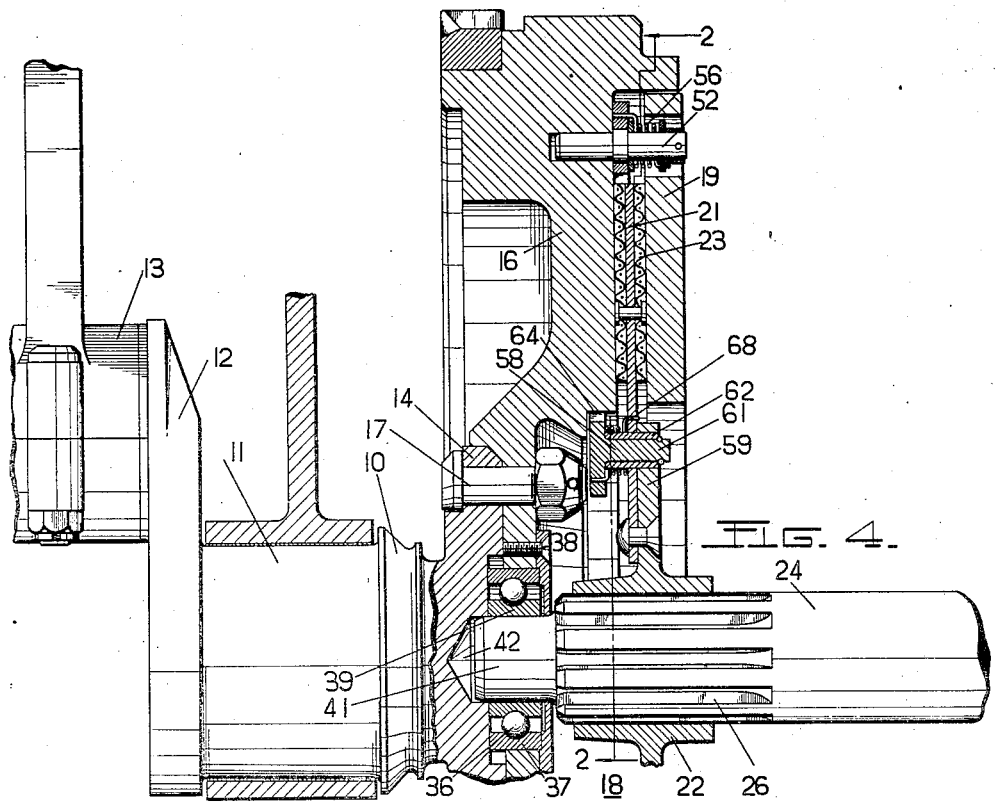
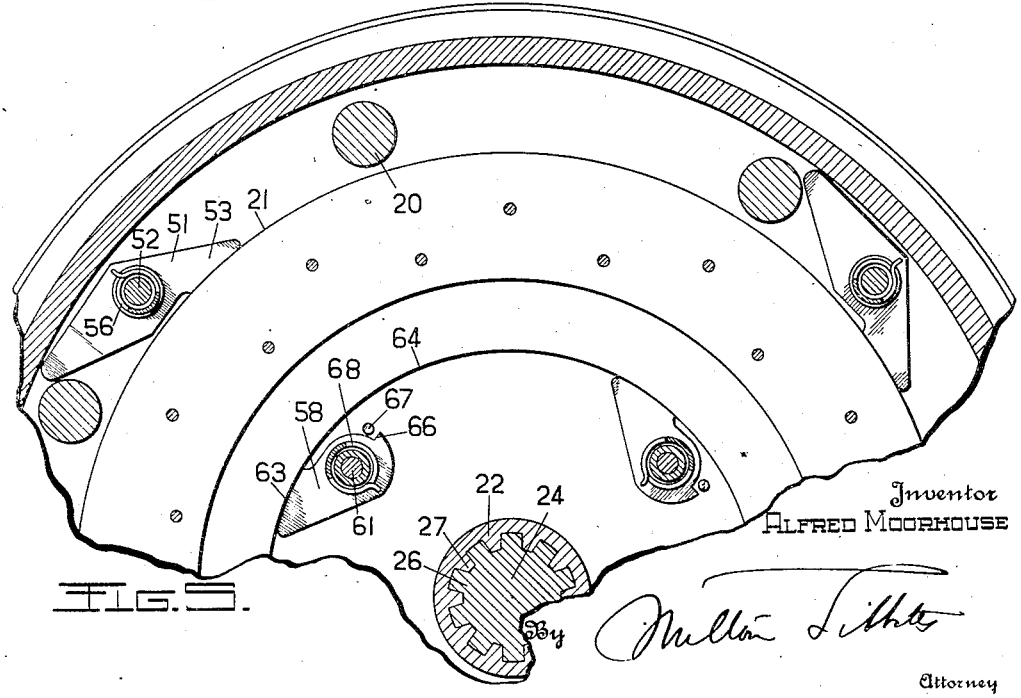
Inventor
Alfred Moorhouse
By
Attorney Patented Nov. 28, 1933

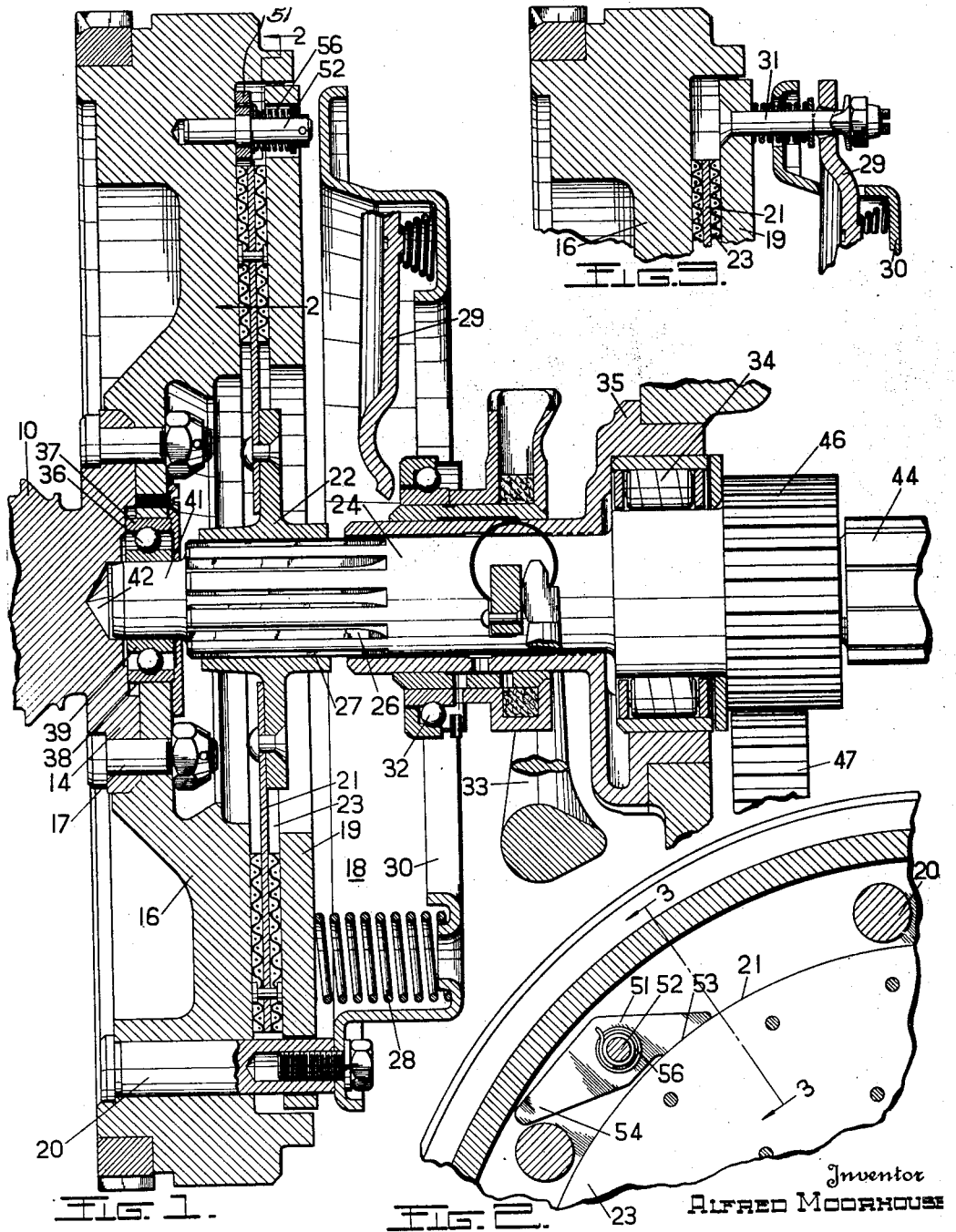

1,936,685

UNITED STATES PATENT OFFICE 1,936,685

CLUTCH

Alfred Moorhouse, Detroit, Mich., assignor to Packard Motor Car Company, Detroit, Mich., a corporation of Michigan Application December 29, 1928
Serial No. 329,236

11 Claims. (Cl. 192—68)

This invention relates to motor vehicles and more particularly to the transmission mechanism of such vehicles, and it has for its principal object to provide means whereby free rotation or spinning of the clutch and its associated parts shall be reduced or prevented, and the operation of gear changing be thereby facilitated.

Another object of the invention is to provide a transmission clutch friction device which shall be operative in response to centrifugal force to reduce the relative motion between the parts.

Another object of the invention is to prevent spinning of the clutch shaft by a friction connection to the power shaft of the vehicle engine, the amount of friction depending on the speed of the parts.

Another object of the invention is to provide a clutch friction device in which centrifugally applied frictional pressure shall be augmented by a force derived from the motion of the parts to produce a servo braking effect.

Another object of the invention is to provide a transmission clutch friction device having members responsive to the centrifugal force of each of the rotating parts, each frictionally engaging the other part.

A further object of the invention is to provide a simple, efficient and inexpensive clutch friction device for the transmission mechanism of motor vehicles.

Other objects of the invention will appear from the following description taken in connection with the drawings, which form a part of this specification, and in which:

Fig. 1 is a view in longitudinal section, partially in side elevation, through part of the engine and transmission mechanism of a motor vehicle, showing an embodiment of this invention therein;

Fig. 2 is a fragmentary view, partially in rear elevation of the flywheel, and partially in section substantially on the line 2—2 of Fig. 1;

Fig. 3 is a fragmentary sectional view taken substantially on the line 3—3 of Fig. 2;

Fig. 4 is a view corresponding in part to Fig. 1, showing another form of the invention, and Fig. 5 is a view similar to Fig. 2, showing the modification of the invention illustrated in Fig. 4.

In the sliding type of selective transmission which is in common use on motor vehicles today, it has been found that the driven element, including the clutch shaft, the driven clutch discs and some of the gears, frequently rotates freely or spins for a considerable period after being freed from the crank shaft by disengagement of the clutch. As it is essential to smooth and quiet gear shifting that the gears to be engaged have approximately the same peripheral speed, such spinning necessitates a considerable pause between the disengagement of one set of gears and the engagement of another, while the spinning elements slow down to the proper speed. This makes gear shifting a delicate and somewhat tedious operation, and prevents rapid and easy shifting from one gear to another, which is frequently desirable. Considerable damage to gear teeth and other parts of the transmission mechanism may result from the forcible engagement of gears not rotating at the proper speeds, when the exigencies of vehicle operation demand an immediate shift.

However, upon throttling the engine down to idling speed preparatory to shifting gears, the crank shaft slows down very rapidly, and it has been previously proposed, and has become common practice, to "double clutch" when a rapid shift of gears is desired. In double clutching, the clutch is momentarily re-engaged while the gears are in neutral or unmeshed position, which has the effect of momentarily connecting the clutch shaft to the engine crank shaft after the latter has slowed down to an idling speed. The clutch and the crank shaft are thus used as a brake to reduce the speed of the clutch shaft and the transmission. If this operation is performed with precision it secures the desired result, but the practice requires considerable skill and becomes quite laborious when frequently performed, as in traffic.

Various mechanical means have also been proposed for slowing down the spinning clutch shaft, in which a stationary brake is manually applied to the moving elements through some device such as the clutch release mechanism, which is under the control of the vehicle operator. Such devices, however, have been clumsy and inefficient, mechanically weak, and expensive to build and maintain.

Referring to the accompanying drawings, at 10 is shown an engine crank shaft having journal portions 11, best shown in Fig. 4, by which it is rotatably mounted in suitable bearings and having cranks 12 adapted to be driven in the well known manner by connecting rods 13. The rear end of the shaft 10 has an integral flange 14, to which a flywheel 16 is secured as by bolts 17.

In line with the crank shaft 10 is a friction clutch 18 of conventional construction, having a driving element or plate 19 which is driven from the flywheel in any convenient way as by the pins 20, and a driven plate or element 21 which is secured to a suitable flange on a hub member 22. This driven plate 21 is provided with suitable friction material 23 in the well known manner to secure frictional engagement between the driving and the driven elements. The hub 22 is mounted on a driven or clutch shaft 24 which is splined as at 26, to cooperate with splines 27 in the bore of the hub 22, whereby the hub and shaft will rotate together and the hub may slide on the shaft. The driving and driven members of the clutch 18 are urged axially into engagement by the usual clutch springs 28, which clamp the friction facings 23 between the members 16 and 19 to secure a driving connection.

Suitable means is also provided for separating the driving and driven members, to disengage the clutch. As illustrated, this comprises a number of fingers 29 which form levers fulcrumed on an annular plate 30, which also carries the clutch springs 28. The fingers 29 are connected by any suitable means such as the bolts 31 to the driving plate 19, as shown in Fig. 3. These fingers or levers are adapted to move the clutch members axially of the clutch shaft 24 against the action of the clutch springs. Suitable springs are provided between the fingers 29 and the associated parts to prevent rattling and play. The inner ends of the fingers 29 are adapted to engage the outer race of a clutch-operating or throwout bearing 32, which is adapted to slide axially of the shaft 24, and is moved by suitable levers 33 actuated by the vehicle operator in the usual way.

The clutch shaft 24 is journaled rearwardly of the splines 27 in a suitable bearing 34 provided in the end wall of a transmission gear case 35, and near its forward end it is supported in an annular bearing 36, the outer race 37 of which is secured to the inner edge 38 of the web of the flywheel 16. The inner race 39 of the bearing 36 cooperates with a reduced portion 41 at the forward end of the shaft 24, which portion projects into a recess or opening 42 in the end of the crank shaft 10. The rear end of the shaft 24 projects through the bearing 34 into the gear housing 35. As clutches of such construction are well known in the art to which this invention relates, further description thereof is unnecessary.

The transmission gearing within the housing 35 is of conventional form and includes a splined transmission shaft 44, coaxial with the clutch shaft, and the usual countershaft parallel thereto (not shown), which is driven from a gear 46 on the rear end of the clutch shaft 24 in constant mesh with a countershaft gear 47. The splined shaft 44 carries gears (not shown), which are rotatable with the shaft and are also slidable thereon, and which may be meshed with the countershaft gears to vary the reduction ratio of the gearing, in a manner well known in the art.

When it is desired to shift gears, the engine is throttled to idling speed, the clutch 18 is disengaged, and the transmission gears are shifted out of engagement into neutral or unmeshed position. At this time, the clutch shaft 24, the driven clutch elements, and the connected countershaft gears are disconnected from both the engine and the propeller shaft, so that they are free to rotate in their various bearings until slowed down by bearing friction, and by the resistance of oil in the gear housing. To prevent the prolonged spinning of these elements this invention provides a simple and effective frictional device, which is entirely automatic in its action and which operates in accordance with the speed of the rotating parts.

This frictional device is operatively mounted between the crank shaft 10 or the flywheel 16 thereon, and the clutch shaft 24. In the embodiment illustrated in Figs. 1 and 2 it comprises a number of friction members or shoes 51, each pivotally mounted on a suitable support such as the pin 52, circumferentially spaced on the flywheel. Each pin has a supporting portion fixed in and carried by the rim portion of the flywheel 16, so that each member 51 thus constitutes a lever. Each friction member also has oppositely disposed arms, one having a friction face 53 on one side of the pivotal mounting and the other constituting a weight or inertia portion 54 on the other side thereof. The weight portion is preferably of sufficient length to engage the adjacent driving pin 20 so as to limit pivotal movement in one direction. The friction face 53 is adapted to frictionally engage the driven element, comprising the plate 21 and the friction faces 23 thereon at the peripheral edge of the plate 21, and it is urged into engagement therewith by the centrifugal force of rotation acting on the weight portion 54. Such engagement is opposed by a light torsional spring 56 surrounding the pin 52 and attached at one end to the pin and at the other end to the friction member 51. When the device is not in operation as a frictional drag, the weight portion or arm 54 is retained in contact with the pin 20, thus preventing rattling. The spring also holds the friction member out of engagement at low engine speeds to prevent dragging of the clutch, as when starting the vehicle from rest.

Any desired number of the friction devices 51, when the driven member is overrunning the driving member, may be utilized, and these are preferably evenly spaced around the periphery of the driven clutch element between the clutch pins 20. The relation of the arms and fulcrum of the lever 51 is such that upon frictional engagement of the parts a moment of the friction force acts to increase the frictional pressure between the face 53 and the plate 21. In this way a servo braking action is established, so that a powerful retarding effect is quickly built up.

The operation of this device will be clearly understood from the preceding description. The centrifugal force acts, by reason of the rotation of the pins 52 with the flywheel, on the inertia portions 54 of the frictional members. This causes a pivotal movement of each frictional member about its pin 52 against the action of the spring 56, which movement brings the friction face 53 into engagement with the periphery of the driven clutch element, and frictionally resists relative movement between the driving clutch element 16—19 and the driven clutch element 21—23. This frictional resistance or braking increases rapidly because of the servo action, and retards the driven clutch element, preventing or greatly reducing the spinning of the driven clutch element and its associated parts.

In Figs. 4 and 5 is illustrated another form of the invention in which drag or friction members are carried by the driven clutch element. In this arrangement the drag shoes or friction members 58 are pivotally mounted on the flange 59 by which the driven clutch member is secured to the splined hub 22, each being provided for this purpose with a pivot portion 61 journaled in a bushing 62 suitably secured in the flange 59. Each of the members 58 has a friction or braking face 63 adapted to contact with the face of a circular shoulder 64 formed on the flywheel 16. The hub of each member 58 is provided with a shoulder 66, adapted to contact a stop pin 67 in the clutch member 21, and this shoulder is urged toward the pin by a suitable spring 68, connected between the friction member 58 and the clutch plate 21. These springs 68 are similar in form and in purpose to the springs 56 in the modification shown in Figs. 1 and 2.

It will be evident that as the members 58 are carried around by the spinning clutch member, they are subjected to the action of centrifugal force, which will turn them on their pivots against the action of the spring 68 to bring the friction face 63 into engagement with the shoulder 64, thus retarding the motion of the driven clutch member. As the clutch member may rotate quite rapidly, the centrifugal force acting on the drag shoes is considerable and will exert a powerful frictional effort which may be ample to stop spinning of the clutch. This action is augmented by so disposing the member 58 with respect to its pivotal axis and to the frictional surface as to secure a servo braking action, as previously described. For this reason the members 58 are disposed in the opposite direction to the members 51, since because of their mounting on the driven clutch member the direction of the frictional force is reversed. In either case the frictional force between the frictional face or portion and the pivot has a tangential retarding component and a radial pressure component, which radial component increases with increase of the frictional force to provide the servo effect described. This augments the frictional effort so that when the driven member is overrunning the driving member, it is not necessary to rely entirely upon the centrifugal force to produce the frictional pressure.

It will be understood that where necessary or desirable, a clutch may be provided with frictional members arranged both on the driving and the driven elements, in the manner clearly illustrated in Figs. 4 and 5. By this arrangement, relative movement between the driving and driven clutch elements is opposed by both members 51 and 58, thus providing an extremely powerful frictional engagement of these elements, particularly useful in those cases where the inertia of the spinning parts may be large, as in motor bus transmissions.

It will be understood that various forms of the invention other than those described above may be used without departing from the spirit or scope of the invention.

Having thus described the invention, what is claimed and desired to be secured by Letters Patent is:

1. The combination with a transmission mechanism including a clutch having driving and driven members adapted to frictionally engage each other, of members pivotally mounted on each of said clutch members to frictionally engage the other clutch member in response to centrifugal force.

2. The combination with a transmission mechanism including a clutch having driving and driven members adapted to frictionally engage each other, of friction members carried by each of said clutch members to engage the other clutch member in response to centrifugal force, and spring devices to retract the friction members upon cessation of the centrifugal force.

3. The combination with a transmission mechanism including a clutch having driving and driven members, of friction members carried by each of said clutch members to engage the other clutch member in response to centrifugal force including a lever having a friction portion and a force responsive arm, and a frictional surface on the said arm disposed to automatically increase the frictional effect when the supporting clutch member is over-running the other member, the arms on the driving clutch member being oppositely disposed to those on the driven clutch member.

4. The combination with a transmission mechanism including a clutch having driving and driven members adapted to frictionally engage each other, of a frictional device comprising friction shoes pivotally mounted in the driven member and movable in response to centrifugal force to engage the driving member.

5. The combination with a transmission mechanism including a clutch comprising a driving member, and a driven member having a hub thereon, said driving and driven members being adapted to frictionally engage each other, of friction members pivotally mounted on said hub to engage the driving member in response to centrifugal force, to thereby reduce the relative movement between the driving and driven members.

6. The combination with a transmission mechanism including a clutch having driving and driven members, of pivoted members responsive to centrifugal force and having frictional surfaces thereon to effect a frictional connection between the clutch members, said frictional surfaces being disposed in a manner to automatically increase the frictional engagement when the driven member is over-running the driving member, and spring devices to prevent pivotal movement of the said members at low speeds.

7. The combination with a transmission mechanism including a clutch having driving and driven members, of friction members pivotally mounted on one of said clutch members, each having a portion to frictionally engage the other clutch member in response to centrifugal force, said engaging portion leading the pivot in the direction of frictional thrust when the driven member is over-running the driving member to thereby increase the frictional engagement, and said engaging surface following the pivot in the direction of frictional thrust when said driving member is over-running the driven member to effect a frictional drag between the members.

8. The combination with a transmission mechanism including a clutch having driving and driven members, of friction members pivotally mounted on one of said clutch members, each friction member having a portion to frictionally engage the periphery of the other clutch member in response to centrifugal force, said engaging portion leading the pivot in the direction of frictional thrust when the driven member is over-running the driving member.

9. The combination with a transmission mechanism including a clutch having driving and driven members, of pivots on one of said members, a friction member mounted on each pivot having a portion to frictionally engage the other clutch member in response to centrifugal force, said pivots being so disposed with respect to the friction portions that a component of the frictional force tends to increase the pressure of the friction portion on said clutch member when the said driven member is overrunning the driving member.

10. The combination with a transmission mechanism including a clutch having relatively movable driving and driven members, of friction devices pivotally mounted on each of said clutch members to engage the other, some of said devices being so mounted with respect to the point of engagement that the frictional force has a component tending to increase the engagement pressure when the driven member is overrunning the driving member.

11. The combination with a transmission mechanism including a clutch having driving and driven members, of axially disposed pins on the driven member, bearing members pivotally mounted on said pins having weighted ends with friction surfaces to engage the driving member, each of said members being so mounted with respect to the point of engagement that the frictional force has a component tending to increase the engagement pressure when the driven member is over-running the driving member, and spring means connecting the bearing members to said pins to oppose the action of centrifugal force on the weight portions.

ALFRED MOORHOUSE.